United States Patent
Hart et al.

(10) Patent No.: US 8,425,371 B2
(45) Date of Patent: Apr. 23, 2013

(54) MULTI-SPEED TRANSMISSION HAVING THREE PLANETARY GEAR SETS

(75) Inventors: James M. Hart, Belleville, MI (US); Andrew W. Phillips, Rochester, MI (US); Scott H. Wittkopp, Ypsilanti, MI (US); Clinton E. Carey, Highland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 281 days.

(21) Appl. No.: 12/834,322

(22) Filed: Jul. 12, 2010

(65) Prior Publication Data

US 2011/0034287 A1 Feb. 10, 2011

Related U.S. Application Data

(60) Provisional application No. 61/231,605, filed on Aug. 5, 2009.

(51) Int. Cl.
*F16H 3/44* (2006.01)
*F16H 37/06* (2006.01)

(52) U.S. Cl.
USPC ........... 475/280; 475/269; 475/282; 475/284; 475/330

(58) Field of Classification Search .................... 475/280
See application file for complete search history.

(56) References Cited

U.S. PATENT DOCUMENTS

| | | | |
|---|---|---|---|
| 6,656,077 B2 * | 12/2003 | Usoro et al. | 475/275 |
| 6,709,360 B2 | 3/2004 | Raghavan et al. | |
| 7,651,434 B2 * | 1/2010 | Carey et al. | 475/323 |
| 7,766,782 B2 * | 8/2010 | Wittkopp et al. | 475/275 |
| 7,998,014 B2 * | 8/2011 | Hart et al. | 475/278 |

* cited by examiner

*Primary Examiner* — David D Le
*Assistant Examiner* — Colby M Hansen

(57) ABSTRACT

A transmission is provided having an input member, an output member, three planetary gear sets, a plurality of coupling members and a plurality of torque transmitting devices. Each of the planetary gear sets includes first, second and third members. The torque transmitting devices include clutches and brakes.

26 Claims, 8 Drawing Sheets

| GEAR STATE | GEAR RATIO | RATIO STEP | TORQUE TRANSMITTING ELEMENTS | | | | |
|---|---|---|---|---|---|---|---|
| | | | 32 | 34 | 28 | 26 | 30 |
| REV | -2.248 | | | X | | X | |
| N | | -0.60 | | | | | |
| 1ST | 3.777 | | | X | X | | |
| 2ND | 2.491 | 1.52 | | X | | | X |
| 3RD | 1.630 | 1.53 | X | | X | | |
| 4TH | 1.075 | 1.52 | X | | | | X |
| 5TH | 0.834 | 1.29 | | | X | X | |
| 6TH | 0.659 | 1.26 | | | | X | X |

X = ON - ENGAGED CARRYING TORQUE
O = ON - ENGAGED NOT CARRYING TORQUE

| GEAR STATE | GEAR RATIO | RATIO STEP | TORQUE TRANSMITTING ELEMENTS | | | | |
|---|---|---|---|---|---|---|---|
| | | | 132 | 134 | 126 | 128 | 130 |
| REV | -2.213 | | | X | X | | |
| N | | -0.49 | | | | | |
| 1ST | 4.495 | | | X | | X | |
| 2ND | 3.021 | 1.49 | | X | | | X |
| 3RD | 2.088 | 1.45 | X | | | X | |
| 4TH | 1.403 | 1.49 | X | | | | X |
| 5TH | 1.000 | 1.40 | | | X | X | |
| 6TH | 0.811 | 1.23 | | | X | | X |

X = ON - ENGAGED CARRYING TORQUE
O = ON - ENGAGED NOT CARRYING TORQUE

| GEAR STATE | GEAR RATIO | RATIO STEP | TORQUE TRANSMITTING ELEMENTS ||||| 
|---|---|---|---|---|---|---|---|
| | | | 232 | 234 | 228 | 226 | 230 |
| REV | -3.059 | | | X | | X | |
| N | | -0.79 | | | | | |
| 1ST | 3.892 | | | X | | | X |
| 2ND | 2.275 | 1.71 | X | | | | X |
| 3RD | 1.488 | 1.53 | | | | X | X |
| 4TH | 1.143 | 1.30 | | | X | | X |
| 5TH | 0.862 | 1.33 | | | X | X | |
| 6TH | 0.673 | 1.28 | X | | X | | |

X = ON - ENGAGED CARRYING TORQUE
O = ON - ENGAGED NOT CARRYING TORQUE

| GEAR STATE | GEAR RATIO | RATIO STEP | TORQUE TRANSMITTING ELEMENTS | | | | |
|---|---|---|---|---|---|---|---|
| | | | 334 | 332 | 328 | 326 | 330 |
| REV | -2.300 | | X | | | X | |
| N | | -0.56 | | | | | |
| 1ST | 4.140 | | X | | X | | |
| 2ND | 2.937 | 1.41 | X | | | | X |
| 3RD | 1.952 | 1.50 | | X | X | | |
| 4TH | 1.384 | 1.41 | | X | | | X |
| 5TH | 1.000 | 1.38 | | | X | X | |
| 6TH | 0.826 | 1.21 | | | | X | X |

X = ON - ENGAGED CARRYING TORQUE
O = ON - ENGAGED NOT CARRYING TORQUE

| GEAR STATE | GEAR RATIO | RATIO STEP | TORQUE TRANSMITTING ELEMENTS | | | | |
|---|---|---|---|---|---|---|---|
| | | | 430 | 434 | 432 | 428 | 426 |
| REV | -3.081 | | | X | | X | |
| N | | -0.85 | | O | | | |
| 1ST | 3.636 | | X | X | | | |
| 2ND | 2.239 | 1.62 | X | | X | | |
| 3RD | 1.541 | 1.45 | X | | | X | |
| 4TH | 1.175 | 1.31 | X | | | | X |
| 5TH | 0.851 | 1.38 | | | | X | X |
| 6TH | 0.667 | 1.28 | | | X | | X |

X = ON - ENGAGED CARRYING TORQUE
O = ON - ENGAGED NOT CARRYING TORQUE

MULTI-SPEED TRANSMISSION HAVING THREE PLANETARY GEAR SETS

CROSS-REFERENCE TO RELATED APPLICATIONS

This application claims priority to U.S. Provisional Application No. 61/231,605, filed on Aug. 5, 2009, which is hereby incorporated in its entirety herein by reference.

FIELD

The invention relates generally to a multiple speed transmission having a plurality of planetary gear sets and a plurality of torque transmitting devices and more particularly to a transmission having six or more speeds, three planetary gear sets and a plurality of torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, three planetary gear sets, a plurality of coupling members and a plurality of torque transmitting devices. Each of the planetary gear sets includes first, second and third members. The torque transmitting devices are for example clutches and brakes.

In one embodiment, a transmission includes an input member, an output member, first, second and third planetary gear sets each having first, second and third members, a first interconnecting member continuously interconnecting the third member of the first planetary gear set with a stationary member, a second interconnecting member continuously interconnecting the second member of the second planetary gear set with the third member of the third planetary gear set, and a third interconnecting member continuously interconnecting the first member of the second planetary gear set with the first member of the third planetary gear set. A first torque transmitting mechanism is selectively engageable to interconnect the second member of the first planetary gear set and the input member with the third member of the second planetary gear set, a second torque transmitting mechanism is selectively engageable to interconnect the second member of the first planetary gear set and the input member with the first member of the second planetary gear set, a third torque transmitting mechanism is selectively engageable to interconnect the first member of the first planetary gear set with the first member of the second planetary gear set and the first member of the third planetary gear set, a fourth torque transmitting mechanism is selectively engageable to interconnect the third member of the second planetary gear set with the stationary member and a fifth torque transmitting mechanism is selectively engageable to interconnect the second member of the second planetary gear set and the third member of the third planetary gear set with the stationary member. The torque transmitting mechanisms are selectively engageable in combinations of at least two to establish at least six forward speed ratios and at least one reverse speed ratio between the input member and the output member.

In another embodiment, a transmission includes an input member, an output member, first, second and third planetary gear sets each having first, second and third members, a first interconnecting member continuously interconnecting the first member of the first planetary gear set with a stationary member, a second interconnecting member continuously interconnecting the second member of the second planetary gear set with the third member of the third planetary gear set, and a third interconnecting member continuously interconnecting the first member of the second planetary gear set with the second member of the third planetary gear set. A first torque transmitting mechanism is selectively engageable to interconnect the second member of the first planetary gear set with the third member of the second planetary gear set, a second torque transmitting mechanism is selectively engageable to interconnect the third member of the first planetary gear set and the input member with the second member of the second planetary gear set and the third member of the third planetary gear set, a third torque transmitting mechanism is selectively engageable to interconnect the second member of the first planetary gear set with the first member of the third planetary gear set, a fourth torque transmitting mechanism is selectively engageable to interconnect the third member of the second planetary gear set with the stationary member and a fifth torque transmitting mechanism is selectively engageable to interconnect the second member of the second planetary gear set and the third member of the third planetary gear set with the stationary member. The torque transmitting mechanisms are selectively engageable in combinations of at least two to establish at least six forward speed ratios and at least one reverse speed ratio between the input member and the output member.

In another embodiment, a transmission includes an input member, an output member, first, second and third planetary gear sets each having first, second and third members, a first interconnecting member continuously interconnecting the third member of the first planetary gear set with a stationary member, a second interconnecting member continuously interconnecting the second member of the second planetary gear set with the second member of the third planetary gear set, and a third interconnecting member continuously interconnecting the third member of the second planetary gear set with the third member of the third planetary gear set. A first torque transmitting mechanism is selectively engageable to interconnect the second member of the first planetary gear set and the input member with the third member of the second planetary gear set and the third member of the third planetary gear set, a second torque transmitting mechanism is selectively engageable to interconnect the second member of the first planetary gear set and the input member with the first member of the second planetary gear set, a third torque transmitting mechanism is selectively engageable to interconnect the first member of the first planetary gear set with the first member of the second planetary gear set, a fourth torque transmitting mechanism is selectively engageable to interconnect the third member of the second planetary gear set and the third member of the third planetary gear set with the stationary member, and a fifth torque transmitting mechanism is selectively engageable to interconnect the second member of the second planetary gear set and the second member of the third planetary gear set with the stationary member. The torque transmitting mechanisms are selectively engageable in combinations of at least two to establish at least six forward speed ratios and at least one reverse speed ratio between the input member and the output member.

In another embodiment, a transmission includes an input member, an output member, first, second and third planetary gear sets each having first, second and third members, a first interconnecting member continuously interconnecting the third member of the third planetary gear set with a stationary member, a second interconnecting member continuously interconnecting the second member of the first planetary gear set with the second member of the second planetary gear set, and a third interconnecting member continuously interconnecting the third member of the first planetary gear set with the third member of the second planetary gear set. A first torque transmitting mechanism is selectively engageable to interconnect the first member of the third planetary gear set and the input member with the third member of the second planetary gear set and the third member of the first planetary gear set, a second torque transmitting mechanism is selectively engageable to interconnect the second member of the third planetary gear set with the first member of the second planetary gear set, a third torque transmitting mechanism is selectively engageable to interconnect the second member of the third planetary gear set with the first member of the first planetary gear set, a fourth torque transmitting mechanism is selectively engageable to interconnect the first member of the second planetary gear set with the stationary member and a fifth torque transmitting mechanism is selectively engageable to interconnect the third member of the second planetary gear set and the third member of the first planetary gear set with the stationary member. The torque transmitting mechanisms are selectively engageable in combinations of at least two to establish at least six forward speed ratios and at least one reverse speed ratio between the input member and the output member.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 15 is a truth table presenting the state of engagement of the various torque transmitting elements in each of the available forward and reverse speeds or gear ratios of the transmission illustrated in FIGS. 13 and 14.

DETAILED DESCRIPTION

The following description is merely exemplary in nature and is not intended to limit the present disclosure, application, or uses.

At the outset, it should be appreciated that the embodiments of the six speed automatic transmission of the present invention have an arrangement of permanent mechanical connections between the elements of the three planetary gear sets. A third component or element of a first planetary gear set is permanently coupled to a ground. A third component or element of a third planetary gear set is permanently coupled to a second component or element of a second planetary gear set. A second component or element of the third planetary gear set is permanently coupled to a first component or element of the second planetary gear set.

Figure 1:
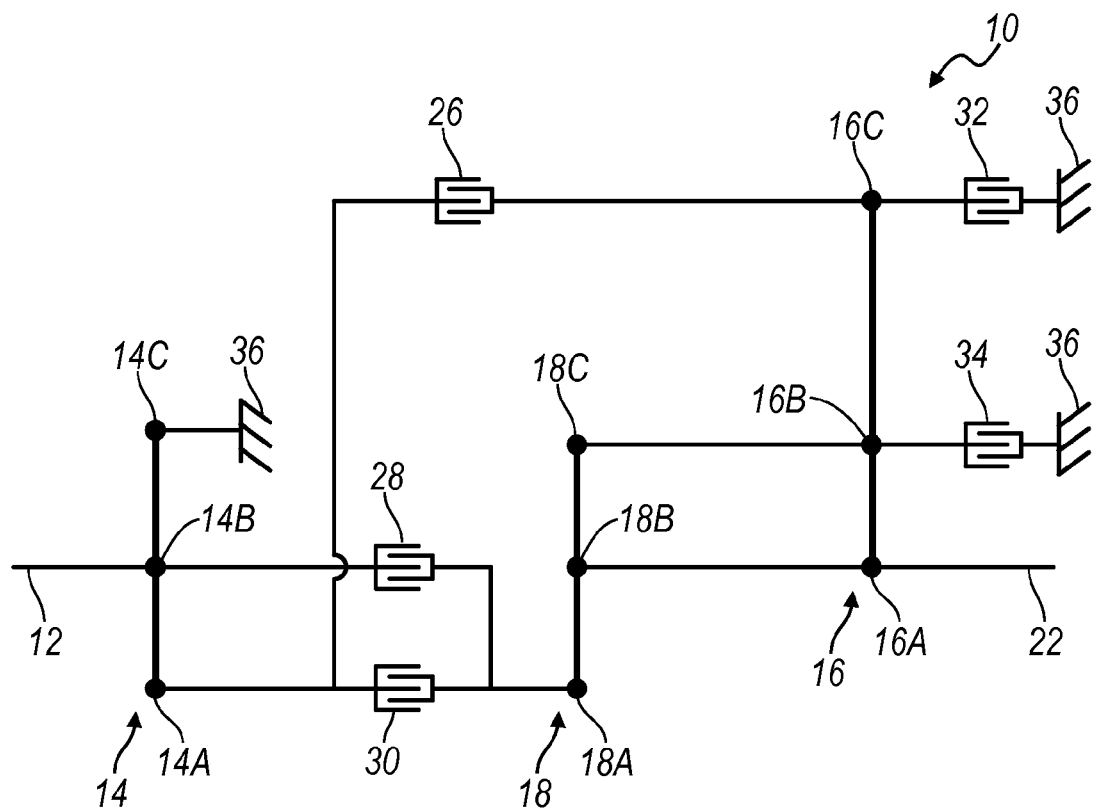
FIG. 1 is a lever diagram of an embodiment of a six speed transmission according to the present invention.

Referring now to FIG. 1, an embodiment of a six speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14, a second planetary gear set 16, a third planetary gear set 18 and an output shaft or member 22. The first planetary gear set 14 has three nodes: a first node 14A, a second node 14B and a third node 14C. The second planetary gear set 16 has three nodes: a first node 16A, a second node 16B and a third node 16C. The third planetary gear set 18 has three nodes: a first node 18A, a second node 18B and a third node 18C.

The input member 12 is continuously coupled to the second node 14B of the first planetary gear set 14. The output member 22 is coupled to the first node 16A of the second planetary gear set 16. The third node 14C of the first planetary gear set 14 is coupled to a stationary member or transmission housing 36. The second node 16B of the second planetary gear set 16 is coupled to the third node 18C of the third planetary gear set 18. The first node 16A of the second planetary gear set 16 is coupled to the second node 18B of the third planetary gear set 18.

A first clutch 26 selectively connects the first node 14A of the first planetary gear set 14 with the third node 16C of the second planetary gear set 16. A second clutch 28 selectively connects the input member 12 and the second node 14B of the first planetary gear set 14 with the first node 18A of the third planetary gear set 18. A third clutch 30 selectively connects the first node 14A of the first planetary gear set 14 with the first node 18A of the third planetary gear set 18. A first brake 32 selectively connects the third node 16C of the second planetary gear set 16 with a stationary member or transmission housing 36. A second brake 34 selectively connects the second node 16B of the second planetary gear set 16 with a stationary member or transmission housing 36.

Figure 2:
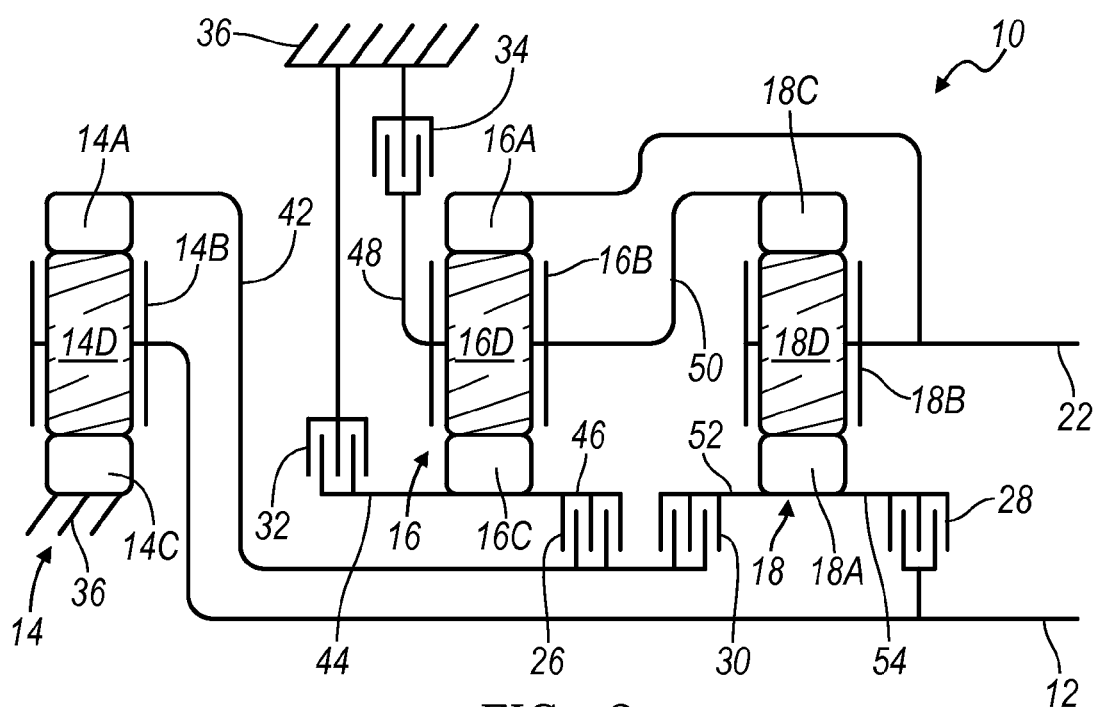
FIG. 2 is a diagrammatic illustration of an embodiment of a six speed transmission according to the present invention.

Referring now to FIG. 2, a stick diagram presents a schematic layout of the embodiment of the six speed transmission 10 according to the present invention. In FIG. 2, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers.

For example, the planetary gear set 14 includes a sun gear member 14C, a ring gear member 14A and a planet gear carrier member 14B that rotatably supports a set of planet gears 14D (only one of which is shown). The sun gear member 14C is connected to the stationary member or transmission housing 36 in order to prevent the sun gear member 14C from rotating relative to the transmission housing 36. The ring gear member 14A is connected for common rotation with a first shaft or interconnecting member 42. The planet carrier member 14B is connected for common rotation with the input member 12. The planet gears 14D are each configured to intermesh with both the sun gear member 14C and the ring gear member 14A.

The planetary gear set 16 includes a sun gear member 16C, a ring gear member 16A and a planet gear carrier member 16B that rotatably supports a set of planet gears 16D (only one of which is shown). The sun gear member 16C is connected for common rotation with a second shaft or interconnecting member 44 and with a third shaft or interconnecting member 46. The ring gear member 16A is connected for common rotation with the output member 22. The planet carrier member 16B is connected for common rotation with a fourth shaft or interconnecting member 48 and a fifth shaft or interconnecting member 50. The planet gears 16D are each configured to intermesh with both the sun gear member 16C and the ring gear member 16A.

The planetary gear set 18 includes a sun gear member 18A, a ring gear member 18C and a planet gear carrier member 18B that rotatably supports a set of planet gears 18D (only one of which is shown). The sun gear member 18A is connected for common rotation with a sixth shaft or interconnecting member 52 a seventh shaft or interconnecting member 54. The ring gear member 18C is connected for common rotation with the fifth shaft or interconnecting member 50. The planet carrier member 18B is connected for common rotation with the output member or shaft 22. The planet gears 18D are each configured to intermesh with both the sun gear member 18A and the ring gear member 18C.

The input shaft or member 12 is continuously connected to an engine (not shown) or to a turbine of a torque converter (not shown). The output shaft or member 22 is continuously connected with the final drive unit or transfer case (not shown).

The torque-transmitting mechanisms or clutches 26, 28, 30 and brakes 32 and 34 allow for selective interconnection of the shafts or interconnecting members, members of the planetary gear sets and the housing. For example, the first clutch 26 is selectively engageable to connect the first shaft or interconnecting member 42 with the third shaft or interconnecting member 46. The second clutch 28 is selectively engageable to connect the input member 12 with the seventh shaft or interconnecting member 54. The third clutch 30 is selectively engageable to connect the first shaft or interconnecting member 42 with the sixth shaft or interconnecting member 52. The first brake 32 is selectively engageable to connect the second shaft or interconnecting member 44 with the stationary element or the transmission housing 36 in order to restrict the member 44 from rotating relative to the transmission housing 36. The second brake 34 is selectively engageable to connect the fourth shaft or interconnecting member 48 with the stationary element or the transmission housing 36 in order to restrict the member 48 from rotating relative to the transmission housing 36.

Figures 3, 4:
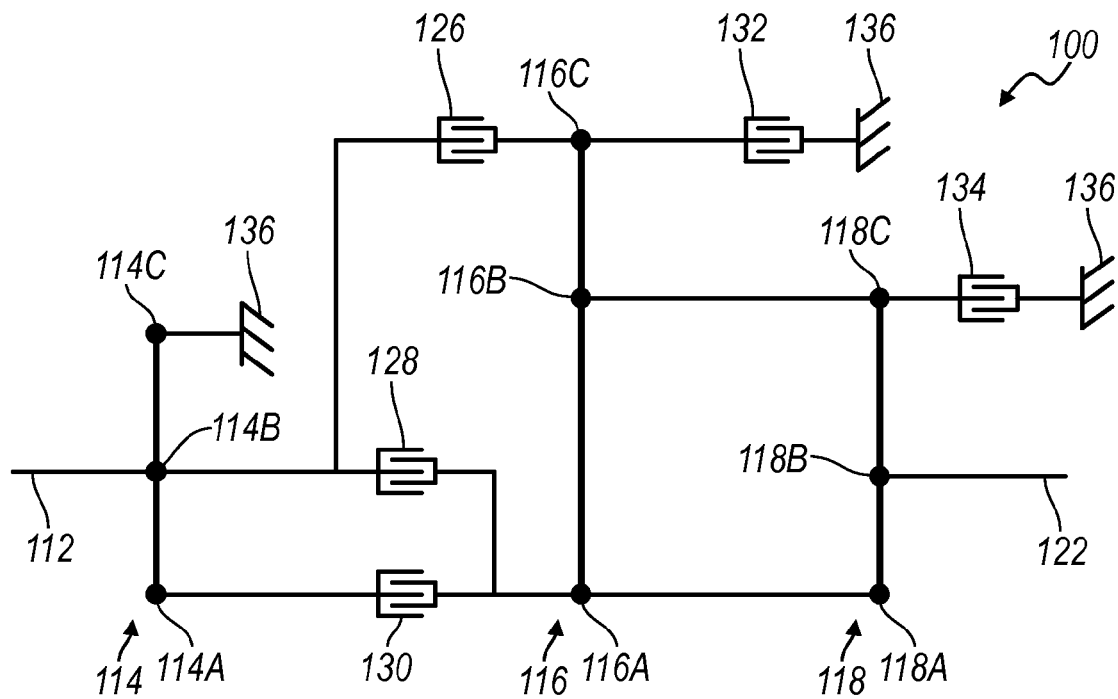
FIG. 3 is a truth table presenting the state of engagement of the various torque transmitting elements in each of the available forward and reverse speeds or gear ratios of the transmissions illustrated in FIGS. 1 and 2.
FIG. 4 is a lever diagram of an embodiment of a six speed transmission according to the present invention.

Referring now to FIGS. 2 and 3, the operation of the embodiment of the six speed transmission 10 will be described. It will be appreciated that transmission 10 are capable of transmitting torque from the input shaft or member 12 to the output shaft or member 22 in at least six forward speed or torque ratios and at least one reverse speed or torque ratio. Each forward and reverse speed or torque ratio is attained by engagement of one or more of the torque-transmitting mechanisms (i.e. first clutch 26, second clutch 28, third clutch 30, first brake 32 and second brake 34), as will be explained below. FIG. 3 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. Actual numerical gear ratios of the various gear states are also presented although it should be appreciated that these numerical values are exemplary only and that they may be adjusted over significant ranges to accommodate various applications and operational criteria of the transmission 10. An example of the gear ratios that may be obtained using the embodiments of the present invention are also shown in FIG. 3. Of course, other gear ratios are achievable depending on the gear diameter, gear teeth count and gear configuration selected.

To establish a reverse gear, the first clutch 26 and the second brake 34 are engaged or activated. The first clutch 26 connects the first shaft or interconnecting member 42 with the third shaft or interconnecting member 46. The second brake 34 connects the fourth shaft or interconnecting member 48 with the stationary element or the transmission housing 36 in order to restrict the member 48 from rotating relative to the transmission housing 36. Likewise, the six forward ratios are achieved through different combinations of clutch and brake engagement, as shown in FIG. 3.

It will be appreciated that the foregoing explanation of operation and gear states of the six speed transmission 10 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

Referring now to FIG. 4, another embodiment of a six speed transmission 100 is illustrated in a lever diagram format. The transmission 100 includes an input shaft or member 112, a first planetary gear set 114, a second planetary gear set 116, a third planetary gear set 118 and an output shaft or member 122. The first planetary gear set 114 has three nodes: a first node 114A, a second node 114B, and a third node 114C. The second planetary gear set 116 has three nodes: a first node 116A, a second node 116B, and a third node 116C. The third planetary gear set 118 has three nodes: a first node 118A, a second node 118B and a third node 118C.

The input member 112 is continuously coupled to the second node 114B of the first planetary gear set 114. The output member 122 is coupled to the second node 118B of the third planetary gear set 118. The third node 114C of the first planetary gear set 114 is coupled to a stationary member or a transmission housing 136. The second node 116B of the second planetary gear set 116 is coupled to the third node 118C of the third planetary gear set 118. The first node 118A of the third planetary gear set 118 is coupled to the first node 116A of the second planetary gear set 116.

A first clutch 126 selectively connects the second node 114B of the first planetary gear set 114 with the third node 116C of the second planetary gear set 116. A second clutch 128 selectively connects the second node 114B of the first planetary gear set 114 with the first node 116A of the second planetary gear set 116 and the first node 118A of the third planetary gear set 118. A third clutch 130 selectively connects the first node 114A of the first planetary gear set 114 with the first node 116A of the second planetary gear set 116 and the first node 118A of the third planetary gear set 118. A first brake 132 selectively connects the third node 116C of the second planetary gear set 116 with a stationary member or transmission housing 136. A second brake 134 selectively connects the third node 118C of the third planetary gear set 118 and the second node 116B of the second planetary gear set 116 with a stationary member or transmission housing 136.

Figures 5, 6:
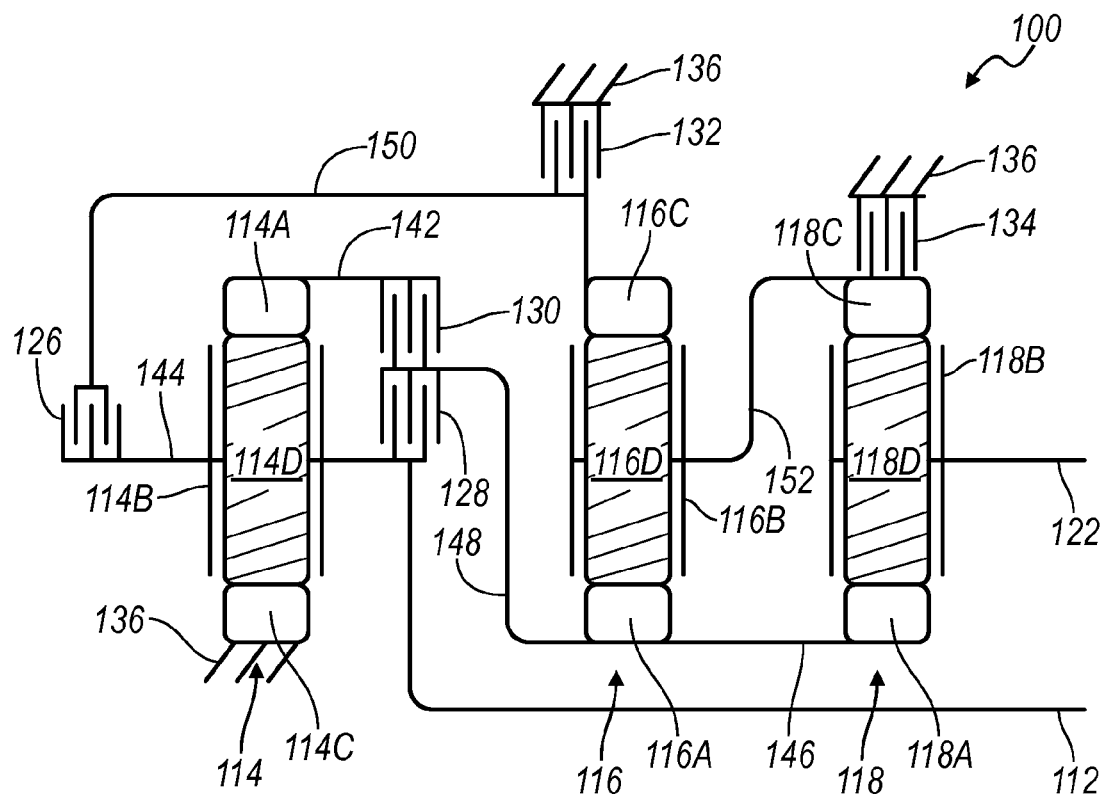
FIG. 5 is a diagrammatic illustration of an embodiment of a six speed transmission according to the present invention.
FIG. 6 is a truth table presenting the state of engagement of the various torque transmitting elements in each of the available forward and reverse speeds or gear ratios of the transmission illustrated in FIGS. 4 and 5.

Referring now to FIG. 5, a stick diagram presents a schematic layout of the embodiment of the six speed transmission 100 according to the present invention. In FIG. 5, the numbering from the lever diagram of FIG. 4 is carried over. The clutches and couplings are correspondingly presented whereas the nodes of the planetary gear sets now appear as components of planetary gear sets such as sun gears, ring gears, planet gears and planet gear carriers.

For example, the planetary gear set 114 includes a sun gear member 114C, a ring gear member 114A and a planet gear carrier member 114B that rotatably supports a set of planet gears 114D (only one of which is shown). The sun gear member 114C is connected for common rotation the stationary member or transmission housing 136 in order to prevent the sun gear member 114C from rotating relative to the transmission housing 136. The ring gear member 114A is connected for common rotation with a first shaft or interconnecting member 142. The planet carrier member 114B is connected for common rotation with a second shaft or interconnecting member 144 and the input member 112. The planet gears 114D are each configured to intermesh with both the sun gear member 114C and the ring gear member 114A.

The planetary gear set 116 includes a sun gear member 116A, a ring gear member 116C and a planet gear carrier member 116B that rotatably supports a set of planet gears 116D (only one of which is shown). The sun gear member 116A is connected for common rotation with a third shaft or interconnecting member 146 and a fourth shaft or interconnecting member 148. The ring gear member 116C is connected for common rotation with a fifth shaft or interconnecting member 150. The planet carrier member 116B is connected for common rotation with a sixth shaft or interconnecting member 152. The planet gears 116D are each configured to intermesh with both the sun gear member 116A and the ring gear member 116C.

The planetary gear set 118 includes a sun gear member 118A, a ring gear member 118C and a planet gear carrier member 118B that rotatably supports a set of planet gears 118D (only one of which is shown). The sun gear member 118A is connected for common rotation with the third shaft or interconnecting member 146. The ring gear member 118C is connected for common rotation with the sixth shaft or interconnecting member 152. The planet carrier member 118B is connected for common rotation with the output member 122. The planet gears 118D are each configured to intermesh with both the sun gear member 118A and the ring gear member 118C.

The input shaft or member 112 is continuously connected to an engine (not shown) or to a turbine of a torque converter (not shown). The output shaft or member 122 is continuously connected with the final drive unit or transfer case (not shown).

The torque-transmitting mechanisms or clutches 126, 128, and 130 and brakes 132 and 134 allow for selective interconnection of the shafts or interconnecting members, members of the planetary gear sets and the housing. For example, the first clutch 126 is selectively engageable to connect the second shaft or interconnecting member 144 with the fifth shaft or interconnecting member 150. The second clutch 128 is selectively engageable to connect the fourth shaft or interconnecting member 148 with the input shaft or member 112. The third clutch 130 is selectively engageable to connect the first shaft or interconnecting member 142 with the fourth shaft or interconnecting member 148. The first brake 132 is selectively engageable to connect the fifth shaft or interconnecting member 150 with the stationary element or the transmission housing 136 in order to restrict the member 150 from rotating relative to the transmission housing 136. The second brake 134 is selectively engageable to connect the sixth shaft or interconnecting member 152 with the stationary element or the transmission housing 136 in order to restrict the member 152 from rotating relative to the transmission housing 136.

Referring now to FIG. 5 and FIG. 6, the operation of the embodiment of the six speed transmission 100 will be described. It will be appreciated that transmission 100 is capable of transmitting torque from the input shaft or member 112 to the output shaft or member 122 in at least six forward speed or torque ratios and at least one reverse speed or torque ratio. Each forward and reverse speed or torque ratio is attained by engagement of one or more of the torque-transmitting mechanisms (i.e. first clutch 126, second clutch 128, third clutch 130, first brake 132, and second brake 134), as will be explained below. FIG. 6 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. Actual numerical gear ratios of the various gear states are also presented although it should be appreciated that these numerical values are exemplary only and that they may be adjusted over significant ranges to accommodate various applications and operational criteria of the transmission 100. An example of the gear ratios that may be obtained using the embodiments of the present invention are also shown in FIG. 6. Of course, other gear ratios are achievable depending on the gear diameter, gear teeth count and gear configuration selected.

To establish a reverse gear, the first clutch 126 and the second brake 134 are engaged or activated. The first clutch 126 connects the second shaft or interconnecting member 144 with the fifth shaft or interconnecting member 150. The second brake 134 connects the sixth shaft or interconnecting member 152 with the stationary element or the transmission housing 136 in order to restrict the member 152 from rotating relative to the transmission housing 136. Likewise, the six forward ratios are achieved through different combinations of clutch and brake engagement, as shown in FIG. 6.

It will be appreciated that the foregoing explanation of operation and gear states of the six speed transmission 100 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

Figure 7:
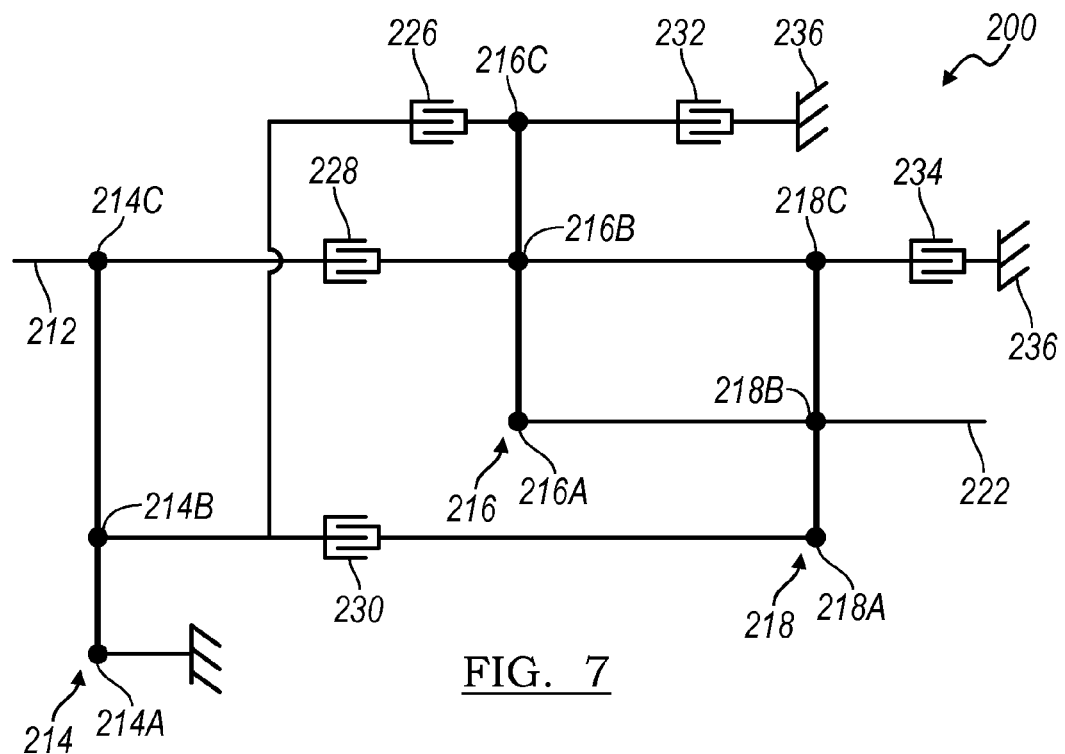
FIG. 7 is a lever diagram of an embodiment of a six speed transmission according to the present invention.

Referring now to FIG. 7, another embodiment of a six speed transmission 200 is illustrated in a lever diagram format. The transmission 200 includes an input shaft or member 212, a first planetary gear set 214, a second planetary gear set 216, a third planetary gear set 218 and an output shaft or member 222. The first planetary gear set 214 has three nodes: a first node 214A, a second node 214B, and a third node 214C. The second planetary gear set 216 has three nodes: a first node 216A, a second node 216B, and a third node 216C. The third planetary gear set 218 has three nodes: a first node 218A, a second node 218B and a third node 218C.

The input member 212 is continuously coupled to the third node 214C of the first planetary gear set 214. The output member 222 is coupled to the second node 218B of the third planetary gear set 218. The second node 216B of the second planetary gear set 216 is coupled to the third node 218C of the third planetary gear set 218. The first node 216A of the second planetary gear set 216 is coupled to the second node 218B of the third planetary gear set 218. The first node 214A of the first planetary gear set 214 is coupled to a stationary member or a transmission housing 236.

A first clutch 226 selectively connects the second node 214B of the first planetary gear set 214 with the third node 216C of the second planetary gear set 216. A second clutch 228 selectively connects the third node 214C of the first planetary gear set 214 and the input member 212 with the third node 218C of the third planetary gear set 218 and the second node 216B of the second planetary gear set 216. A third clutch 230 selectively connects the second node 214B of the first planetary gear set 214 with the first node 218A of the third planetary gear set 218. A first brake 232 selectively connects the third node 216C of the second planetary gear set 216 with a stationary member or transmission housing 236. A second brake 234 selectively connects the second node 216B of the second planetary gear set 216 and the third node 218C of the third planetary gear set 218 with a stationary member or transmission housing 236.

Figure 8:
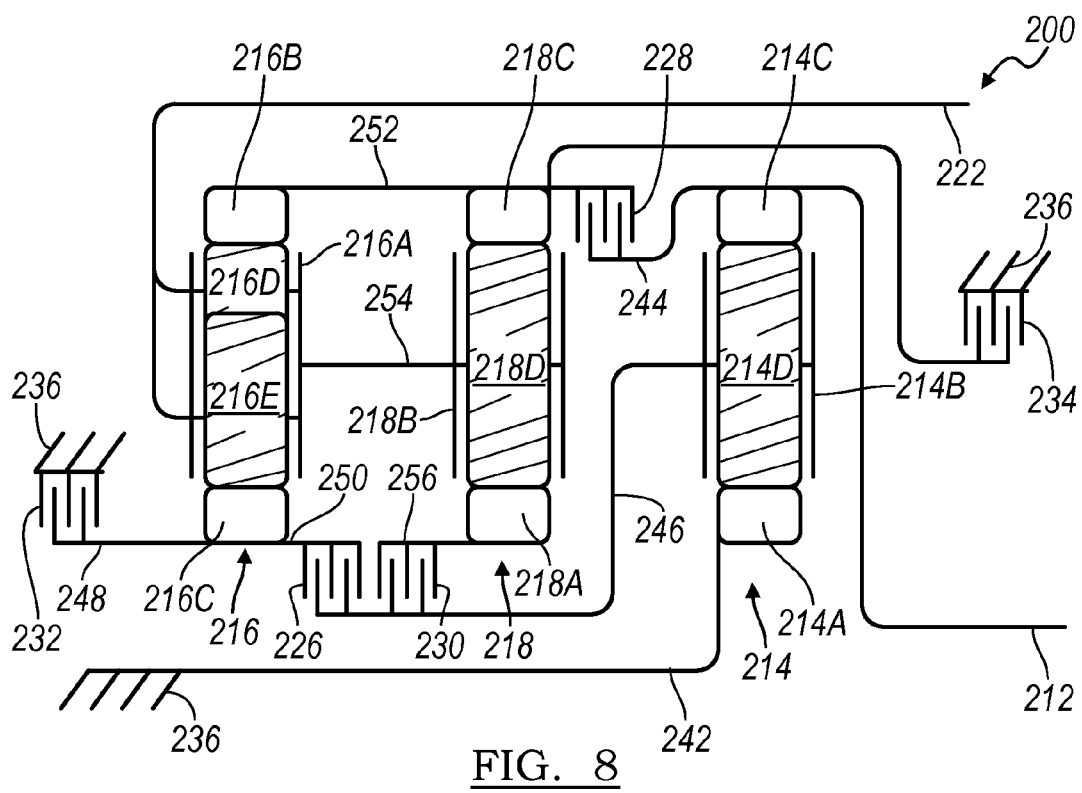
FIG. 8 is a diagrammatic illustration of an embodiment of a six speed transmission according to the present invention.

Referring now to FIG. 8, a stick diagram presents a schematic layout of the embodiment of the six speed transmission 200 according to the present invention. In FIG. 8, the numbering from the lever diagram of FIG. 7 is carried over. The clutches and couplings are correspondingly presented whereas the nodes of the planetary gear sets now appear as components of planetary gear sets such as sun gears, ring gears, planet gears and planet gear carriers.

For example, the planetary gear set 214 includes a sun gear member 214A, a ring gear member 214C and a planet gear carrier member 214B that rotatably supports a set of planet gears 214D (only one of which is shown). The sun gear member 214A is connected for common rotation with a first shaft or interconnecting member 242. The ring gear member 214C is connected for common rotation with a second shaft or interconnecting member 244 and the input member 212. The planet carrier member 214B is connected for common rotation with a third shaft or interconnecting member 246. The planet gears 214D are each configured to intermesh with both the sun gear member 214A and the ring gear member 214C.

The planetary gear set 216 includes a sun gear member 216C, a ring gear member 216B and a planet gear carrier member 216A that rotatably supports a set of planet gears 216D (only one of which is shown) and a set of planet gears 216E (only one of which is shown). The sun gear member 216C is connected for common rotation with a fourth shaft or interconnecting member 248 and a fifth shaft or interconnecting member 250. The ring gear member 216B is connected for common rotation with a sixth shaft or interconnecting member 252. It should be appreciated that the sixth member 252 may be broken up into several separate connected members without departing from the scope of the present invention. The planet carrier member 216A is connected for common rotation with a seventh shaft or interconnecting member 254 and the output member 222. The planet gears 216D are each configured to intermesh with both the planet gears 216E and the ring gear member 216B. The planet gears 216E are configured each to intermesh with both the planet gears 216D and the sun gear member 216C.

The planetary gear set 218 includes a sun gear member 218A, a ring gear member 218C and a planet gear carrier member 218B that rotatably supports a set of planet gears 218D (only one of which is shown). The sun gear member 218A is connected for common rotation with an eighth shaft or interconnecting member 256. The ring gear member 218C is connected for common rotation with the sixth shaft or interconnecting member 252. The planet carrier member 218B is connected for common rotation with the seventh shaft or interconnecting member 254. The planet gears 218D are each configured to intermesh with both the sun gear member 218A and the ring gear member 218C.

The input shaft or member 212 is continuously connected to an engine (not shown) or to a turbine of a torque converter (not shown). The output shaft or member 222 is continuously connected with the final drive unit or transfer case (not shown).

The torque-transmitting mechanisms or clutches 226, 228 and 230 and brakes 232 and 234 allow for selective interconnection of the shafts or interconnecting members, members of the planetary gear sets and the housing. For example, the first clutch 226 is selectively engageable to connect the third shaft or interconnecting member 246 with the fifth shaft or interconnecting member 250. The second clutch 228 is selectively engageable to connect the sixth shaft or interconnecting member 252 with the second shaft or interconnecting member 244 and the input member 212. The third clutch 230 is selectively engageable to connect the third shaft or interconnecting member 246 with the eighth shaft or interconnecting member 256. The first brake 232 is selectively engageable to connect the fourth shaft or interconnecting member 248 with the stationary element or the transmission housing 236 in order to restrict the member 248 from rotating relative to the transmission housing 236. The second brake 234 is selectively engageable to connect the sixth shaft or interconnecting member 252 with the stationary element or the transmission housing 236 in order to restrict the member 252 from rotating relative to the transmission housing 236.

Figures 9, 10:
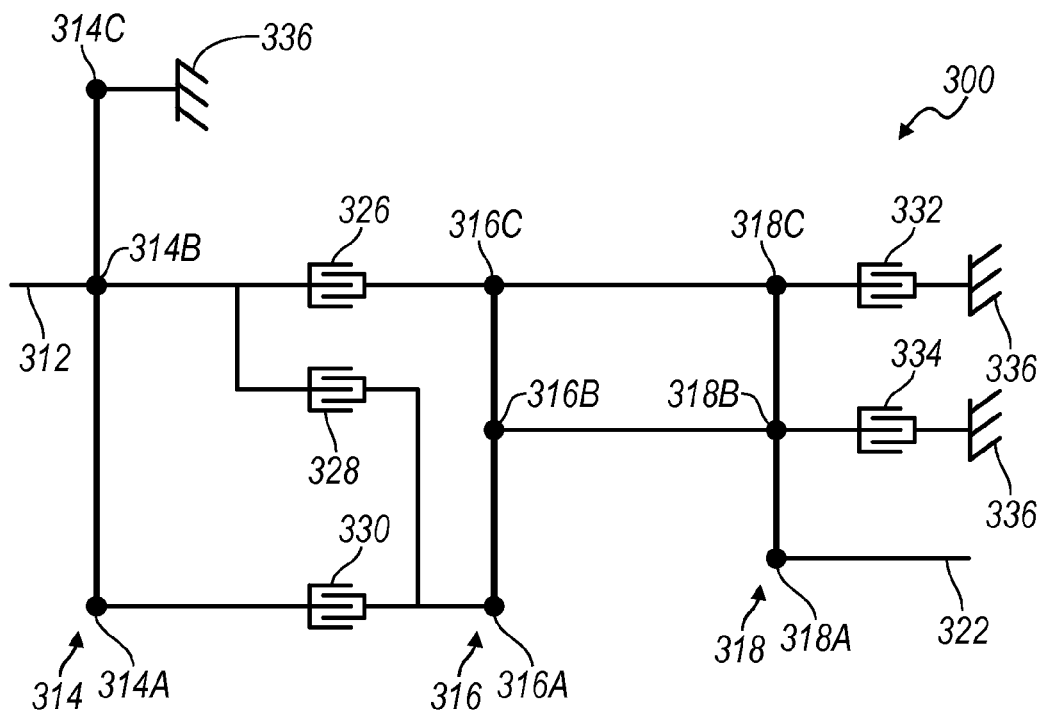
FIG. 9 is a truth table presenting the state of engagement of the various torque transmitting elements in each of the available forward and reverse speeds or gear ratios of the transmission illustrated in FIGS. 7 and 8.
FIG. 10 is a lever diagram of an embodiment of a six speed transmission according to the present invention.

Referring now to FIG. 8 and FIG. 9, the operation of the embodiment of the six speed transmission 200 will be described. It will be appreciated that transmission 200 is capable of transmitting torque from the input shaft or member 212 to the output shaft or member 222 in at least six forward speed or torque ratios and at least one reverse speed or torque ratio. Each forward and reverse speed or torque ratio is attained by engagement of one or more of the torque-transmitting mechanisms (i.e. first clutch 226, second clutch 228, third clutch 230, first brake 232 and second brake 234), as will be explained below. FIG. 9 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. Actual numerical gear ratios of the various gear states are also presented although it should be appreciated that these numerical values are exemplary only and that they may be adjusted over significant ranges to accommodate various applications and operational criteria of the transmission 200. An example of the gear ratios that may be obtained using the embodiments of the present invention are also shown in FIG. 9. Of course, other gear ratios are achievable depending on the gear diameter, gear teeth count and gear configuration selected.

To establish a reverse gear, the first clutch 226 and the second brake 234 are engaged or activated. The first clutch 226 connects the third shaft or interconnecting member 246 with the fifth shaft or interconnecting member 250. The second brake 234 connects the sixth shaft or interconnecting member 252 with the stationary element or the transmission housing 236 in order to restrict the member 252 from rotating relative to the transmission housing 236. Likewise, the six forward ratios are achieved through different combinations of clutch and brake engagement, as shown in FIG. 9.

It will be appreciated that the foregoing explanation of operation and gear states of the six speed transmission 200 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

Referring now to FIG. 10, another embodiment of a six speed transmission 300 is illustrated in a lever diagram format. The transmission 300 includes an input shaft or member 312, a first planetary gear set 314, a second planetary gear set 316, a third planetary gear set 318 and an output shaft or member 322. The first planetary gear set 314 has three nodes: a first node 314A, a second node 314B and a third node 314C. The second planetary gear set 316 has three nodes: a first node 316A, a second node 316B and a third node 316C. The third planetary gear set 318 has three nodes: a first node 318A, a second node 318B and a third node 318C.

The input member 312 is continuously coupled to the second node 314B of the first planetary gear set 314. The output member 322 is coupled to the first node 318A of the third planetary gear set 318. The third node 316C of the second planetary gear set 316 is coupled to the third node 318C of the third planetary gear set 318. The second node 316B of the second planetary gear set 316 is coupled to the second node 318B of the third planetary gear set 318. The third node 314C of the first planetary gear set 314 is coupled to a stationary member or a transmission housing 336.

A first clutch 326 selectively connects the input member 312 and the second node 314B of the first planetary gear set 314 with the third node 316C of the second planetary gear set 316 and the third node 318C of the third planetary gear set 318. A second clutch 328 selectively connects the input member 314 and the second node 314B of the first planetary gear set 314 with the first node 316A of the second planetary gear set 316. A third clutch 330 selectively connects the first node 314A of the first planetary gear set 314 with the first node 316A of the second planetary gear set 316. A first brake 332 selectively connects the third node 316C of the second planetary gear set 316 and the third node 318C of the third planetary gear set 318 with a stationary member or transmission housing 336. A second brake 334 selectively connects the second node 316B of the second planetary gear set 316 and the second node 318B of the third planetary gear set 318 with a stationary member or transmission housing 336.

Figures 11, 12:
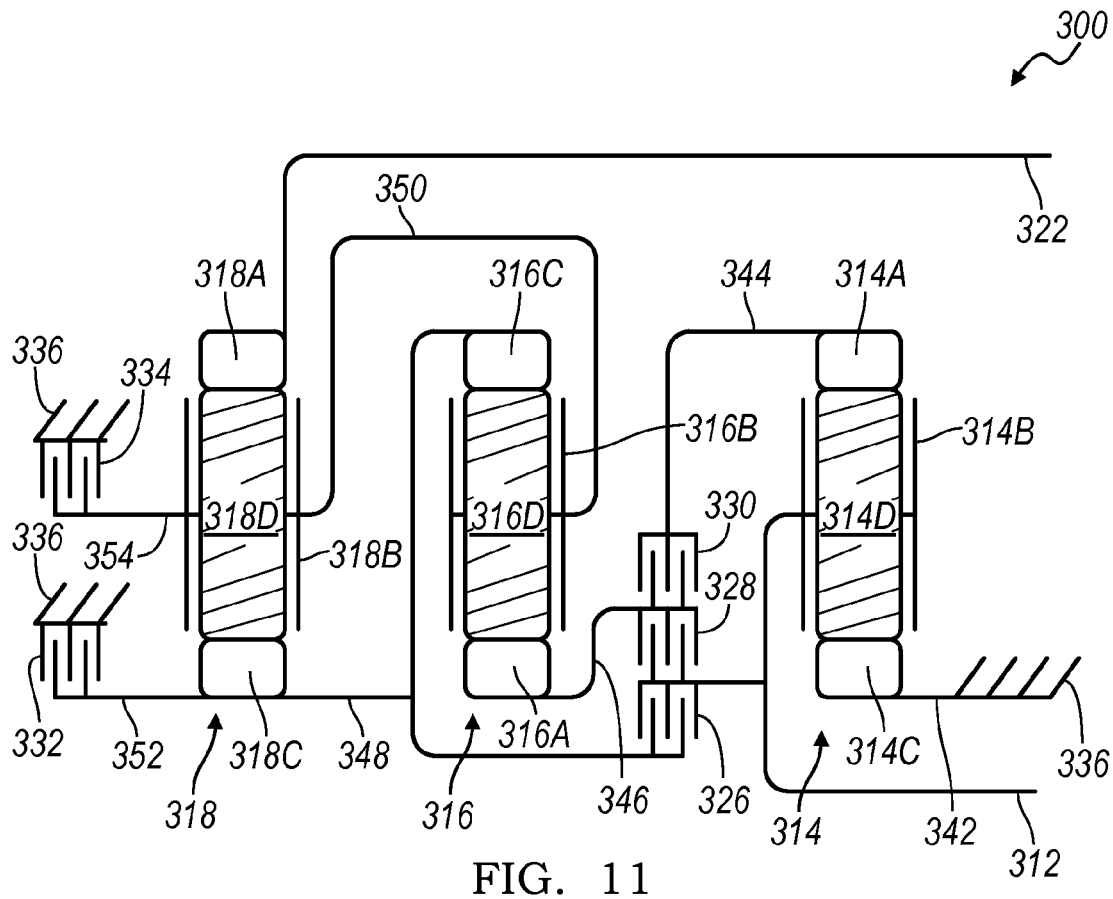
FIG. 11 is a diagrammatic illustration of an embodiment of a six speed transmission according to the present invention.
FIG. 12 is a truth table presenting the state of engagement of the various torque transmitting elements in each of the available forward and reverse speeds or gear ratios of the transmission illustrated in FIGS. 10 and 11.

Referring now to FIG. 11, a stick diagram presents a schematic layout of the embodiment of the six speed transmission 300 according to the present invention. In FIG. 11, the numbering from the lever diagram of FIG. 10 is carried over. The clutches and couplings are correspondingly presented whereas the nodes of the planetary gear sets now appear as components of planetary gear sets such as sun gears, ring gears, planet gears and planet gear carriers.

For example, the planetary gear set 314 includes a sun gear member 314C, a ring gear member 314A and a planet gear carrier member 314B that rotatably supports a set of planet gears 314D (only one of which is shown). The sun gear member 314C is connected for common rotation with a first shaft or interconnecting member 342. The ring gear member 314A is connected for common rotation with a second shaft or interconnecting member 344. The planet carrier member 314B is connected for common rotation with the input member 312. The planet gears 314D are each configured to intermesh with both the sun gear member 314C and the ring gear member 314A.

The planetary gear set 316 includes a sun gear member 316A, a ring gear member 316C and a planet gear carrier member 316B that rotatably supports a set of planet gears 316D (only one of which is shown). The sun gear member 316A is connected for common rotation with a third shaft or interconnecting member 346. The ring gear member 316C is connected for common rotation with a fourth shaft or interconnecting member 348. The planet carrier member 316B is connected for common rotation with a fifth shaft or interconnecting member 350. The planet gears 316D are each configured to intermesh with both the sun gear member 316A and the ring gear member 316C.

The planetary gear set 318 includes a sun gear member 318C, a ring gear member 318A and a planet gear carrier member 318B that rotatably supports a set of planet gears 318D (only one of which is shown). The sun gear member 318C is connected for common rotation with a sixth shaft or interconnecting member 352 and the fourth shaft or interconnecting member 348. The ring gear member 318A is connected for common rotation with the output member 322. The planet carrier member 318B is connected for common rotation with a seventh shaft or interconnecting member 354 and with the fifth shaft or interconnecting member 350. The planet gears 318D are each configured to intermesh with both the sun gear member 318C and the ring gear member 318A.

The input shaft or member 312 is continuously connected to an engine (not shown) or to a turbine of a torque converter (not shown). The output shaft or member 322 is continuously connected with the final drive unit or transfer case (not shown).

The torque-transmitting mechanisms or clutches 326, 328, 330 and brakes 332 and 334 allow for selective interconnection of the shafts or interconnecting members, members of the planetary gear sets and the housing. For example, the first clutch 326 is selectively engageable to connect the input member 312 with the fourth shaft or interconnecting member 348. The second clutch 328 is selectively engageable to connect the third shaft or interconnecting member 346 with the input member 312. The third clutch 330 is selectively engageable to connect the third shaft or interconnecting member 346 with the second shaft or interconnecting member 344. The first brake 332 is selectively engageable to connect the sixth shaft or interconnecting member 352 with the stationary element or the transmission housing 336 in order to restrict the member 352 from rotating relative to the transmission housing 336. The second brake 334 is selectively engageable to connect the seventh shaft or interconnecting member 354 and the fifth shaft or interconnecting member 350 with the stationary element or the transmission housing 336 in order to restrict the members 354, 350 from rotating relative to the transmission housing 336.

Referring now to FIGS. 11 and 12, the operation of the embodiment of the six speed transmission 300 will be described. It will be appreciated that transmission 300 is capable of transmitting torque from the input shaft or member 312 to the output shaft or member 322 in at least six forward speed or torque ratios and at least one reverse speed or torque ratio. Each forward and reverse speed or torque ratio is attained by engagement of one or more of the torque-transmitting mechanisms (i.e. first clutch 326, second clutch 328, third clutch 330, first brake 332 and second brake 334), as will be explained below. FIG. 12 is a truth table presenting the various combinations of torque-transmitting mechanisms that are activated or engaged to achieve the various gear states. An "X" in the box means that the particular clutch or brake is engaged to achieve the desired gear state. Actual numerical gear ratios of the various gear states are also presented although it should be appreciated that these numerical values are exemplary only and that they may be adjusted over significant ranges to accommodate various applications and operational criteria of the transmission 300. An example of the gear ratios that may be obtained using the embodiments of the present invention are also shown in FIG. 12. Of course, other gear ratios are achievable depending on the gear diameter, gear teeth count and gear configuration selected.

To establish a reverse gear, the first clutch 326 and the second brake 334 are engaged or activated. The first clutch 326 connects the input member 312 with the fourth shaft or interconnecting member 348. The second brake 334 connects the seventh shaft or interconnecting member 354 and the fifth shaft or interconnecting member 350 with the stationary element or the transmission housing 336 in order to restrict the members 354, 350 from rotating relative to the transmission housing 336. Likewise, the six forward ratios are achieved through different combinations of clutch and brake engagement, as shown in FIG. 12.

It will be appreciated that the foregoing explanation of operation and gear states of the six speed transmission 300 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

Figure 14:
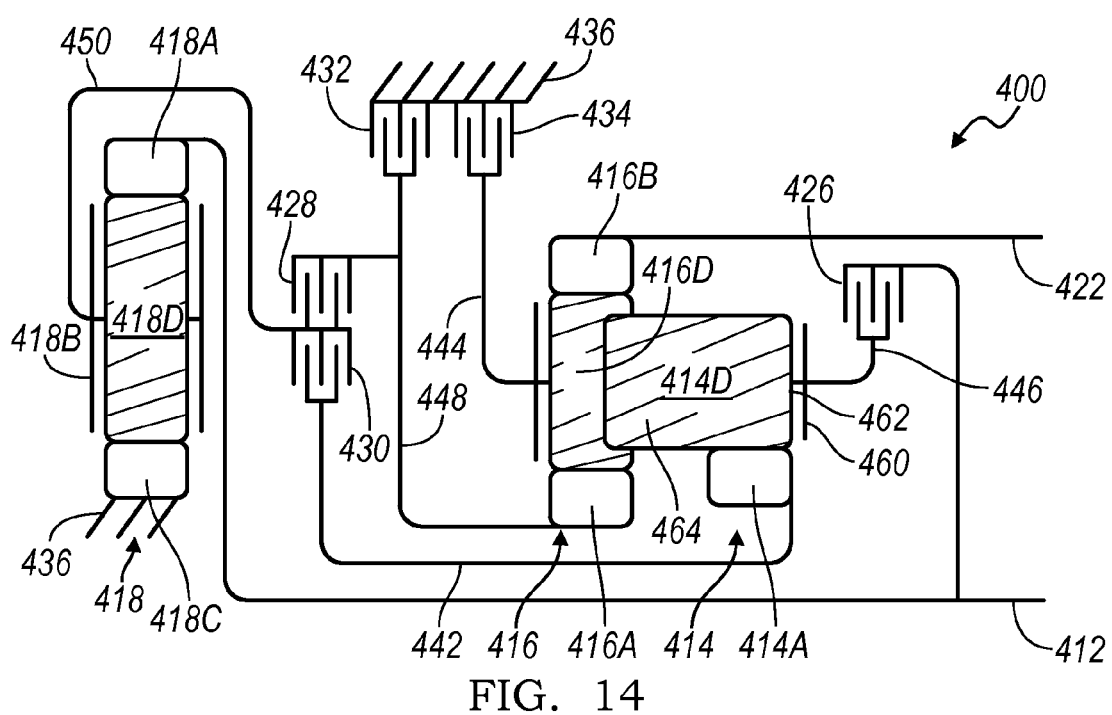
FIG. 14 is a diagrammatic illustration of an embodiment of a six speed transmission according to the present invention.

Referring now to FIG. 14, another embodiment of a six speed transmission 400 is illustrated in a lever diagram format. The transmission 400 includes an input shaft or member 412, a first planetary gear set 414, a second planetary gear set 416, a third planetary gear set 418 and an output shaft or member 422. The first and second planetary gear sets 414, 416 are represented by a single lever sharing common node points. The first planetary gear set 414 has three nodes: a first node 414A, a second node 414B and a third node 414C. The second planetary gear set 416 has three nodes: a first node 416A, a second node 416B and a third node 416C. The third planetary gear set 418 has three nodes: a first node 418A, a second node 418B and a third node 418C.

The input member 412 is continuously coupled to the first node 418A of the third planetary gear set 418. The output member 422 is coupled to the second node 414B of the first planetary gear set 414 and to the second node 416B of the second planetary gear set 416. The third node 418C of the third planetary gear set 418 is coupled to a stationary member or a transmission housing 436. The second node 416B of the second planetary gear set 416 is coupled to the second node 414B of the first planetary gear set 414. The third node 414C of the first planetary gear set 414 is coupled to the third node 416C of the second planetary gear set 416.

A first clutch 426 selectively connects the input member 412 and the first node 418A of the third planetary gear set 418 with the third node 416C of the second planetary gear set 416 and the third node 414C of the first planetary gear set 414. A second clutch 428 selectively connects the second node 418B of the third planetary gear set 418 with the first node 416A of the second planetary gear set 416. A third clutch 430 selectively connects the second node 418B of the third planetary gear set 418 with the first node 414A of the first planetary gear set 414. A first brake 432 selectively connects the first node 416A of the second planetary gear set 416 with a stationary member or transmission housing 436. A second brake 434 selectively connects the third node 416C of the second planetary gear set 416 and the third node 414C of the first planetary gear set 414 with a stationary member or transmission housing 436.

Figure 13:
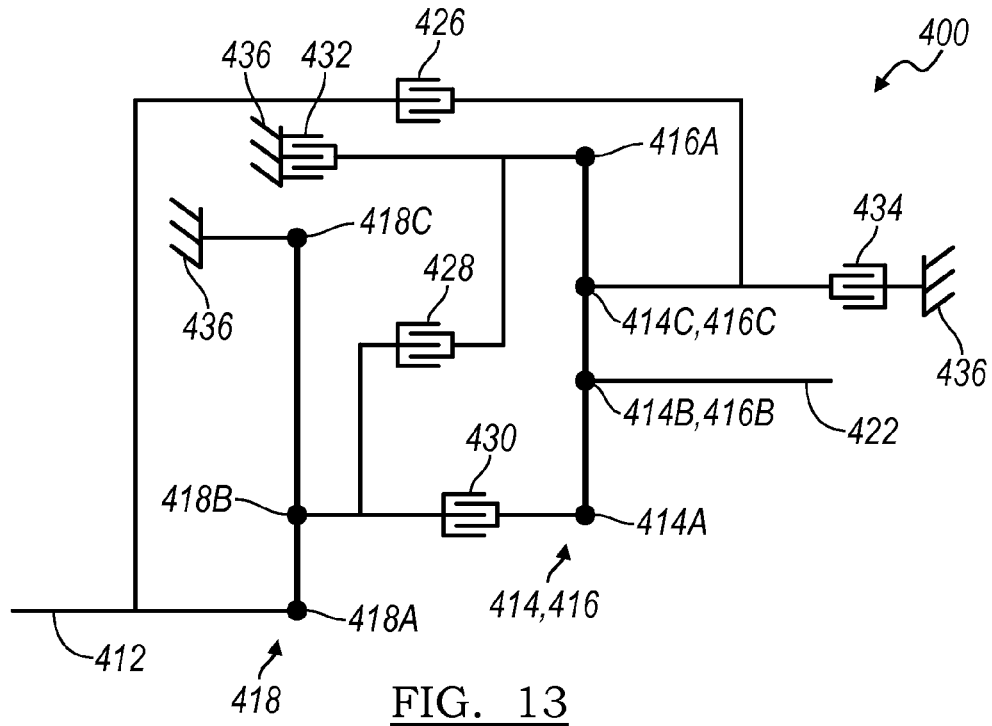
FIG. 13 is a lever diagram of an embodiment of a six speed transmission according to the present invention.

Referring now to FIG. 14, a stick diagram presents a schematic layout of the embodiment of the six speed transmission 400 according to the present invention. In FIG. 14, the numbering from the lever diagram of FIG. 13 is carried over. The clutches and couplings are correspondingly presented whereas the nodes of the planetary gear sets now appear as components of planetary gear sets such as sun gears, ring gears, planet gears and planet gear carriers.

The planetary gear sets 414 and 416 are a combined, or Ravigneaux, gear set. The planetary gear set 414 includes a sun gear member 414A and the planetary gear set 416 includes a sun gear member 416A and a ring gear member 416B. The planetary gear sets 414 and 416 share a common planet gear carrier member 460. The planetary carrier 460 is formed by combining the planet carrier member 414C of the first planetary gear set 414 and the planet carrier member 416C of the second planetary gear set 416 into a single planetary carrier 460. The planetary carrier member 460 rotatably supports a first set of planet gears 414D (only one of which is shown) and a second set of planet gears 416D (only one of which is shown). In addition, the first planetary gear set 414 does not include a separate ring gear. Instead, the planetary gear set 414 "uses", effectively, the ring gear 416B of the second planetary gear set 416 through the meshing relationship of a first and a second set of planet gears 414D and 416D, the sun gear 414A and ring gear 416B.

The sun gear member 414A is connected for common rotation with a first shaft or interconnecting member 442. The planetary carrier member 460 is connected for common rotation with a second shaft or interconnecting member 444 and a third shaft or interconnecting member 446. The sun gear member 416A is connected for common rotation with a fourth shaft or interconnecting member 448. The ring gear member 416B is connected for common rotation with the output member 422. The first set of planet gears 414D each are configured to intermesh the sun gear member 414A at a first end 462 of the planet gears 414D and each are configured to intermesh with the planet gears 416D at a second end 464 of the planet gears 414D. The second set of planet gears 416D are each configured to also intermesh with the sun gear 416A and the ring gear member 416B.

The planetary gear set 418 includes a sun gear member 418C, a ring gear member 418A and a planet gear carrier member 418B that rotatably supports a set of planet gears 418D (only one of which is shown). The sun gear member 418C is connected for common rotation with a stationary member or the transmission housing 436 to prevent the sun gear member 418C from rotating relative to the transmission housing 436. The ring gear member 418A is connected for common rotation with the input member 412. The planet carrier member 418B is connected for common rotation with a fifth shaft or interconnecting member 450. The planet gears 418D are each configured to intermesh with both the sun gear member 418C and the ring gear member 418A.

The input shaft or member 412 is continuously connected to an engine (not shown) or to a turbine of a torque converter (not shown). The output shaft or member 422 is continuously connected with the final drive unit or transfer case (not shown).

The torque-transmitting mechanisms or clutches 426, 428, 430 and brakes 432 and 434 allow for selective interconnection of the shafts or interconnecting members, members of the planetary gear sets and the housing. For example, the first clutch 426 is selectively engageable to connect the input member 412 with the third shaft or interconnecting member 446. The second clutch 428 is selectively engageable to connect the fourth shaft or interconnecting member 448 with the fifth shaft or interconnecting member 450. The third clutch 430 is selectively engageable to connect the first shaft or interconnecting member 442 with the fifth shaft or interconnecting member 450. The first brake 432 is selectively engageable to connect the fourth shaft or interconnecting member 448 with the stationary element or the transmission housing 436 in order to restrict the member 448 from rotating relative to the transmission housing 436. The second brake 434 is selectively engageable to connect the second shaft or interconnecting member 444 with the stationary element or the transmission housing 436 in order to restrict the member 444 from rotating relative to the transmission housing 436.

Referring now to FIGS. 14 and 15, the operation of the embodiment of the six speed transmission 400 will be described. It will be appreciated that transmission 400 is capable of transmitting torque from the input shaft or member 412 to the output shaft or member 422 in at least six forward speed or torque ratios and at least one reverse speed or torque ratio. Each forward and reverse speed or torque ratio is attained by engagement of one or more of the torque-transmitting mechanisms (i.e. first clutch 426, second clutch 428, third clutch 430, first brake 432 and second brake 434), as will be explained below. FIG. 15 is a truth table presenting the various combinations of torque-transmitting mechanisms that are activated or engaged to achieve the various gear states. An "X" in the box means that the particular clutch or brake is engaged to achieve the desired gear state. Actual numerical gear ratios of the various gear states are also presented although it should be appreciated that these numerical values are exemplary only and that they may be adjusted over significant ranges to accommodate various applications and operational criteria of the transmission 400. An example of the gear ratios that may be obtained using the embodiments of the present invention are also shown in FIG. 15. Of course, other gear ratios are achievable depending on the gear diameter, gear teeth count and gear configuration selected.

To establish a reverse gear, the second clutch 428 and the second brake 434 are engaged or activated. The second clutch 428 connects the fourth shaft or interconnecting member 448 with the fifth shaft or interconnecting member 450. The second brake 434 connects the second shaft or interconnecting member 444 with the stationary element or the transmission housing 436 in order to restrict the member 444 from rotating relative to the transmission housing 436. Likewise, the six forward ratios are achieved through different combinations of clutch and brake engagement, as shown in FIG. 15.

It will be appreciated that the foregoing explanation of operation and gear states of the six speed transmission 400 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

We claim the following:

1. A transmission comprising:
   an input member;
   an output member;
   first, second and third planetary gear sets each having first, second and third members, wherein the input and output members are each interconnected to at least one of the first, second, and third planetary gear sets, and wherein the third member of the first planetary gear set, the third member of the second planetary gear set and the first member of the third planetary gear set are sun gears, the second member of the first planetary gear set, the second member of the second planetary gear set, and the second member of the third planetary gear set are carrier members and the first member of the first planetary gear set, the first member of the second planetary gear set and the third member of the third planetary gear set are ring gears;
   a first interconnecting member continuously interconnecting the third member of the first planetary gear set with a stationary member;
   a second interconnecting member continuously interconnecting the second member of the second planetary gear set with the third member of the third planetary gear set;

a third interconnecting member continuously interconnecting the first member of the second planetary gear set with the second member of the third planetary gear set; and five torque transmitting mechanisms each selectively engageable to interconnect at least one of the first, second and third members of the first, second and third planetary gear sets with at least one other of the first, second, third members and a stationary member, and wherein the torque transmitting mechanisms are selectively engageable in combinations of at least two to establish at least six forward speed ratios and at least one reverse speed ratio between the input member and the output member.

2. The transmission of claim 1 wherein a first of the five torque transmitting mechanisms is selectively engageable to interconnect the first member of the first planetary gear set with the third member of the second planetary gear set.

3. The transmission of claim 2 wherein a second of the five torque transmitting mechanisms is selectively engageable to interconnect the second member of the first planetary gear set and the input member with the first member of the third planetary gear set.

4. The transmission of claim 3 wherein a third of the five torque transmitting mechanisms is selectively engageable to interconnect the first member of the first planetary gear set with the first member of the third planetary gear set.

5. The transmission of claim 4 wherein a fourth of the five torque transmitting mechanisms is selectively engageable to interconnect the third member of the second planetary gear set with the stationary member.

6. The transmission of claim 5 wherein a fifth of the five torque transmitting mechanisms is selectively engageable to interconnect the second member of the second planetary gear set and the third member of the third planetary gear set with the stationary member.

7. The transmission of claim 1 wherein two of the torque transmitting mechanisms are brakes for connecting a plurality of the first, second, and third members to the stationary member and three of the torque transmitting mechanisms are clutches for connecting at least one of the first, second, and third members of the first, second and third planetary gear sets to at least one other first, second and third members.

8. The transmission of claim 1 wherein the input member is continuously interconnected to the second member of the first planetary gear set.

9. The transmission of claim 1 wherein the output member is continuously interconnected to the second member of the third planetary gear set and to the first member of the second planetary gear set.

10. A transmission comprising:
an input member;
an output member;
first, second and third planetary gear sets each having first, second and third members;
a first interconnecting member continuously interconnecting the third member of the first planetary gear set with a stationary member;
a second interconnecting member continuously interconnecting the second member of the second planetary gear set with the third member of the third planetary gear set;
a third interconnecting member continuously interconnecting the first member of the second planetary gear set with the first member of the third planetary gear set;
a first torque transmitting mechanism selectively engageable to interconnect the second member of the first planetary gear set and the input member with the third member of the second planetary gear set;
a second torque transmitting mechanism selectively engageable to interconnect the second member of the first planetary gear set and the input member with the first member of the second planetary gear set and the first member of the third planetary gear set;
a third torque transmitting mechanism selectively engageable to interconnect the first member of the first planetary gear set with the first member of the second planetary gear set and the first member of the third planetary gear set;
a fourth torque transmitting mechanism selectively engageable to interconnect the third member of the second planetary gear set with the stationary member; and
a fifth torque transmitting mechanism selectively engageable to interconnect the second member of the second planetary gear set and the third member of the third planetary gear set with the stationary member, and
wherein the torque transmitting mechanisms are selectively engageable in combinations of at least two to establish at least six forward speed ratios and at least one reverse speed ratio between the input member and the output member.

11. The transmission of claim 10 wherein the third member of the first planetary gear set, the first member of the second planetary gear set and the first member of the third planetary gear set are sun gears, the second member of the first planetary gear set, the second member of the second planetary gear set, and the second member of the third planetary gear set are carrier members and the first member of the first planetary gear set, the third member of the second planetary gear set and the third member of the third planetary gear set are ring gears.

12. The transmission of claim 10 wherein the input member is continuously interconnected to the second member of the first planetary gear set.

13. The transmission of claim 10 wherein the output member is continuously interconnected to the second member of the third planetary gear set.

14. A transmission comprising:
an input member;
an output member;
first, second and third planetary gear sets each having first, second and third members;
a first interconnecting member continuously interconnecting the first member of the first planetary gear set with a stationary member, wherein the first interconnecting member is not connected to the second or third planetary gear sets;
a second interconnecting member continuously interconnecting the second member of the second planetary gear set with the third member of the third planetary gear set;
a third interconnecting member continuously interconnecting the first member of the second planetary gear set with the second member of the third planetary gear set;
a first torque transmitting mechanism selectively engageable to interconnect the second member of the first planetary gear set with the third member of the second planetary gear set;
a second torque transmitting mechanism selectively engageable to interconnect the third member of the first planetary gear set and the input member with the second member of the second planetary gear set and the third member of the third planetary gear set;

a third torque transmitting mechanism selectively engageable to interconnect the second member of the first planetary gear set with the first member of the third planetary gear set;
a fourth torque transmitting mechanism selectively engageable to interconnect the third member of the second planetary gear set with the stationary member; and
a fifth torque transmitting mechanism selectively engageable to interconnect the second member of the second planetary gear set and the third member of the third planetary gear set with the stationary member, and
wherein the torque transmitting mechanisms are selectively engageable in combinations of at least two to establish at least six forward speed ratios and at least one reverse speed ratio between the input member and the output member.

15. The transmission of claim 14 wherein the first member of the first planetary gear set, the third member of the second planetary gear set and the first member of the third planetary gear set are sun gears, the second member of the first planetary gear set, the first member of the second planetary gear set, and the second member of the third planetary gear set are carrier members and the third member of the first planetary gear set, the second member of the second planetary gear set and the third member of the third planetary gear set are ring gears.

16. The transmission of claim 14 wherein the input member is continuously interconnected to the third member of the first planetary gear set.

17. The transmission of claim 14 wherein the output member is continuously interconnected to the second member of the third planetary gear set and the first member of the second planetary gear set.

18. A transmission comprising:
an input member;
an output member;
first, second and third planetary gear sets each having first, second and third members;
a first interconnecting member continuously interconnecting the third member of the first planetary gear set with a stationary member;
a second interconnecting member continuously interconnecting the second member of the second planetary gear set with the second member of the third planetary gear set;
a third interconnecting member continuously interconnecting the third member of the second planetary gear set with the third member of the third planetary gear set;
a first torque transmitting mechanism selectively engageable to interconnect the second member of the first planetary gear set and the input member with the third member of the second planetary gear set and the third member of the third planetary gear set;
a second torque transmitting mechanism selectively engageable to interconnect the second member of the first planetary gear set and the input member with the first member of the second planetary gear set;
a third torque transmitting mechanism selectively engageable to interconnect the first member of the first planetary gear set with the first member of the second planetary gear set;
a fourth torque transmitting mechanism selectively engageable to interconnect the third member of the second planetary gear set and the third member of the third planetary gear set with the stationary member; and
a fifth torque transmitting mechanism selectively engageable to interconnect the second member of the second planetary gear set and the second member of the third planetary gear set with the stationary member, and
wherein the torque transmitting mechanisms are selectively engageable in combinations of at least two to establish at least six forward speed ratios and at least one reverse speed ratio between the input member and the output member.

19. The transmission of claim 18 wherein the third member of the first planetary gear set, the first member of the second planetary gear set and the third member of the third planetary gear set are sun gears, the second member of the first planetary gear set, the second member of the second planetary gear set, and the second member of the third planetary gear set are carrier members and the first member of the first planetary gear set, the third member of the second planetary gear set and the first member of the third planetary gear set are ring gears.

20. The transmission of claim 18 wherein the input member is continuously interconnected to the second member of the first planetary gear set.

21. The transmission of claim 18 wherein the output member is continuously interconnected to the first member of the third planetary gear set.

22. A transmission comprising:
an input member;
an output member;
first, second and third planetary gear sets each having first, second and third members;
a first interconnecting member continuously interconnecting the third member of the third planetary gear set with a stationary member;
a second interconnecting member continuously interconnecting the second member of the first planetary gear set with the second member of the second planetary gear set;
a third interconnecting member continuously interconnecting the third member of the first planetary gear set with the third member of the second planetary gear set;
a first torque transmitting mechanism selectively engageable to interconnect the first member of the third planetary gear set and the input member with the third member of the second planetary gear set and the third member of the first planetary gear set;
a second torque transmitting mechanism selectively engageable to interconnect the second member of the third planetary gear set with the first member of the second planetary gear set;
a third torque transmitting mechanism selectively engageable to interconnect the second member of the third planetary gear set with the first member of the first planetary gear set;
a fourth torque transmitting mechanism selectively engageable to interconnect the first member of the second planetary gear set with the stationary member; and
a fifth torque transmitting mechanism selectively engageable to interconnect the third member of the second planetary gear set and the third member of the first planetary gear set with the stationary member, and
wherein the torque transmitting mechanisms are selectively engageable in combinations of at least two to establish at least six forward speed ratios and at least one reverse speed ratio between the input member and the output member.

23. The transmission of claim 22 wherein the first member of the first planetary gear set, the first member of the second planetary gear set and the third member of the third planetary gear set are sun gears, the third member of the first planetary gear set, the third member of the second planetary gear set, and the second member of the third planetary gear set are carrier members and the second member of the first planetary gear set, the second member of the second planetary gear set and the first member of the third planetary gear set are ring gears.

24. The transmission of claim 22 wherein the input member is continuously interconnected to the first member of the third planetary gear set.

25. The transmission of claim 22 wherein the output member is continuously interconnected to the second member of the first planetary gear set and the second member of the second planetary gear set.

26. The transmission of claim 22 wherein the second member of the second planetary gear set and the second member of the first planetary gear set are integrally formed as a single ring gear member.

* * * * *